United States Patent [19]

Hazelwood, Sr.

[11] 4,078,994

[45] Mar. 14, 1978

[54] APPARATUS FOR SEPARATING ENTANGLED PARTS

[76] Inventor: John E. Hazelwood, Sr., 2537 Cicero Rd., Noblesville, Ind. 46060

[21] Appl. No.: 681,494

[22] Filed: Apr. 29, 1976

[51] Int. Cl.² ............................................. B08B 1/28
[52] U.S. Cl. ....................................... 209/235; 209/77;
209/366; 209/346; 74/87; 198/953; 214/8.5 R;
221/292
[58] Field of Search ............... 221/200, 209, 289, 290,
221/292; 209/76, 77, 346, 365 R, 366, 311, 235;
74/61, 87; 214/8.5 R, 308, 309; 198/953

[56] References Cited

U.S. PATENT DOCUMENTS

| 773,900 | 11/1904 | Soder | 209/365 B |
|---|---|---|---|
| 1,425,039 | 8/1922 | Najarian | 209/365 R |
| 1,771,240 | 7/1930 | Worthington | 209/311 |
| 1,971,156 | 8/1934 | Hallenbeck | 209/326 |
| 2,107,729 | 2/1938 | Donovan | 209/329 |
| 2,297,486 | 9/1942 | Linke et al. | 209/311 |
| 2,761,479 | 9/1956 | Geisler et al. | 209/34 |
| 2,974,795 | 3/1961 | Behnke et al. | 209/247 |
| 3,191,774 | 6/1965 | Schrader | 209/329 |
| 3,194,391 | 7/1965 | Hagenbook | 209/365 R |
| 3,390,771 | 7/1960 | Wehner | 209/365 R |
| 3,435,690 | 4/1969 | Amori | 74/61 |

FOREIGN PATENT DOCUMENTS

| 1,155,374 | 11/1957 | France | 209/311 |

Primary Examiner—Wilbur L. Bascomb, Jr.

Attorney, Agent, or Firm—Clarence A. O'Brien; Harvey B. Jacobson

[57] ABSTRACT

A method and apparatus for separating entangled parts includes a receptacle container mounted for reciprocating movement in a vertical direction and having a grid structure at the bottom thereof for supporting and separating component parts which are entangled. In order to overcome the unbalance of the reciprocating container or parts bin a counterweight structure is provided which will effectively counteract or neutralize the unbalance created by the reciprocation of the parts bin. A drive motor through reduction means and connecting rod and crankshaft structure is appropriately connected to both the parts bin and the counterweight structure. The grid structure of the parts bin may be replaced with different size spacing grids for different size of parts to be untangled. The parts are untangled by the method of shaking them in a vertical direction and allowing the parts to be so vibrated that they tend to separate and become unentangled. The speed of reciprocation required by the method of this invention must be fast enough to exceed the pull of gravity by about 3:1. The spacing of the horizontal grid bars preferably is about 10% further apart than the longest dimension of the part to be separated. Also, the size of the grid bars should be large enough to prevent the parts from being forced thereover or locking thereupon. The method of reciprocation allows the parts on the bottom of the mass to spring and/or fall away from the mass through the grid. Because of the rapid rate of movement of the grid the mass of parts is bounced about, allowing the parts on the bottom to untangle and fall through.

13 Claims, 7 Drawing Figures

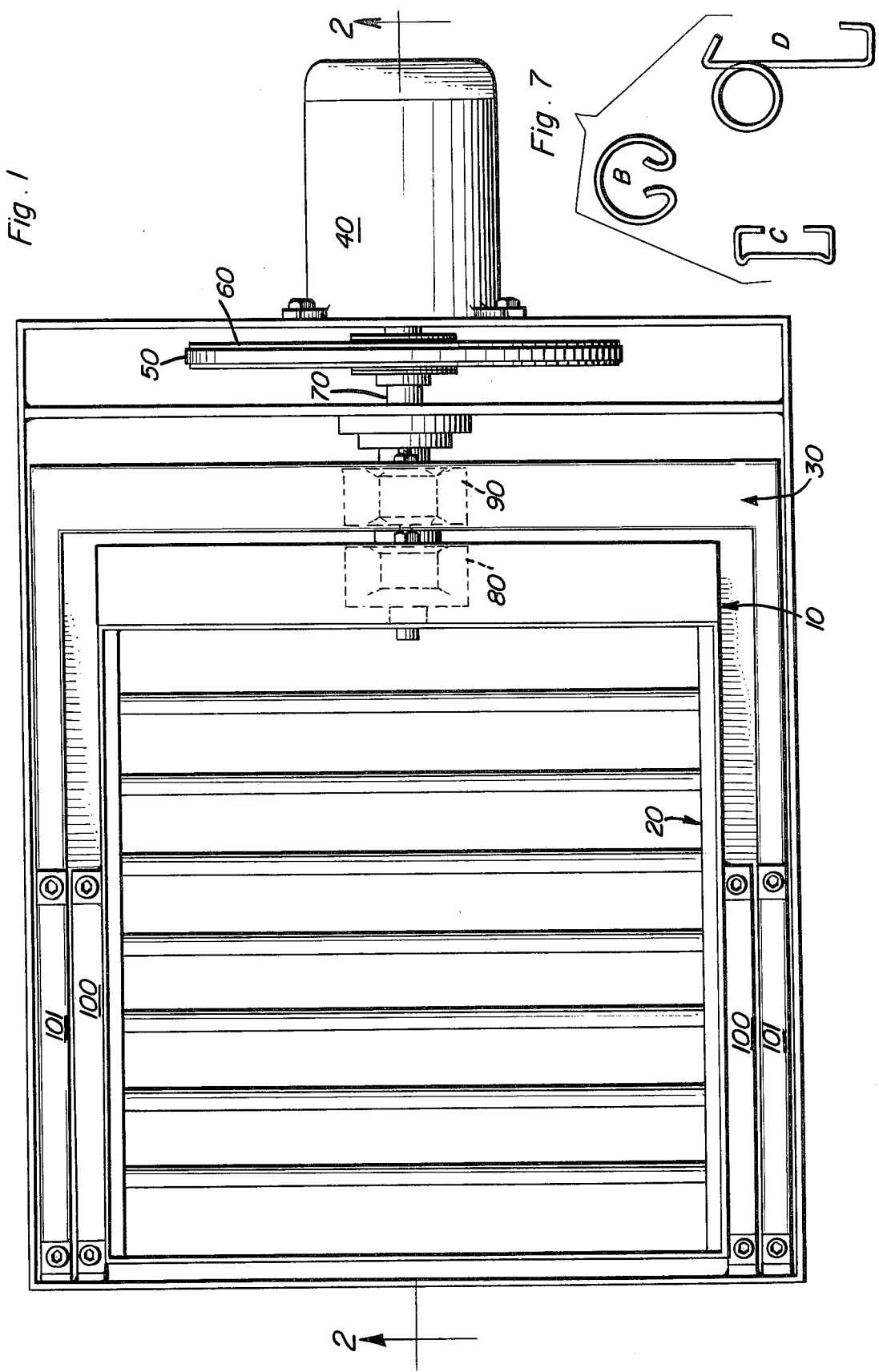

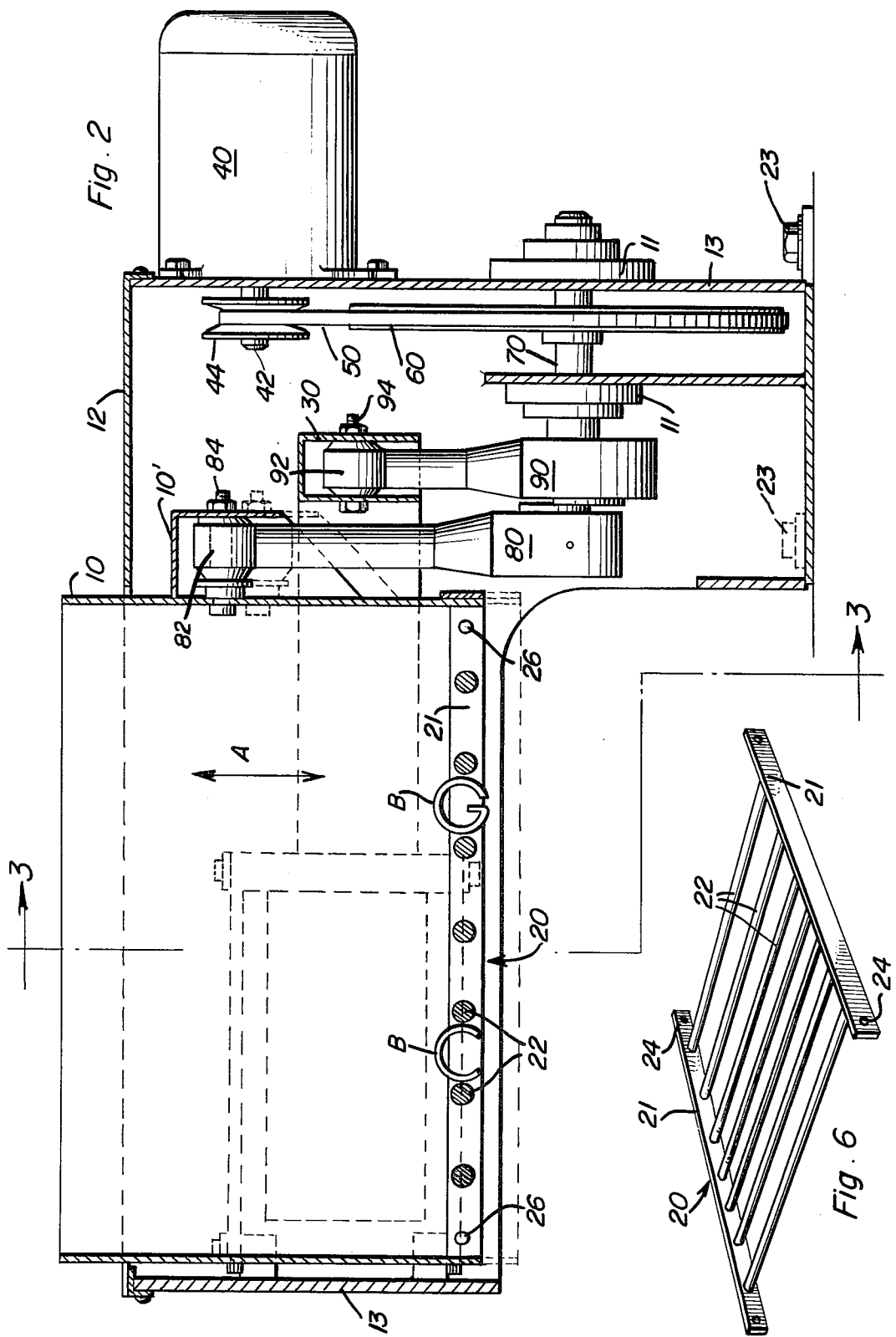

APPARATUS FOR SEPARATING ENTANGLED PARTS

BACKGROUND OF THE INVENTION

1. Field of the Invention

This invention relates generally to a method and apparatus for untangling parts of a wide range and variety of sizes and shapes.

2. Description of the Prior Art

A common problem with known part separators is that they fail to properly untangle component parts without breakage or damage thereto. It is very common for parts of irregular shape to hook or become firmly entangled with each other and it becomes a very difficult and sometimes almost impossible job to untangle same.

Another problem with known devices is that while they will do a fairly good job on one or two types or sizes of parts, they fail to work efficiently and effectively with a wide range of different types of parts and shapes thereof.

Another problem with known devices and methods of separating entangled parts is that the parts are often damaged, broken or bent in the operation of the apparatus and therefore even though untangled, the parts may not be usable for their originally intended purpose.

Another problem is that the method of separating so often employed involves strong physical and structural force upon the entangled parts and do not employ natural gravity action which is more gentle and much less likely to cause damage to the parts.

Known prior art patents which may be pertinent to this invention are as follows:

| | | |
|---|---|---|
| 773,900 | O. Soder | Nov. 1, 1904 |
| 1,971,156 | C. V. Hallenbeck | Aug. 21, 1934 |
| 1,999,673 | D. A. Weber | April 30, 1935 |
| 2,974,795 | G. W. Behnke et al | Mar. 14, 1961 |
| 3,191,774 | P. H. Schrader | June 29, 1965 |

None of these known prior art devices offers the new and unique features of the invention disclosed herein.

SUMMARY OF THE INVENTION

An object of the present invention is to provide a method and apparatus for separating entangled parts that tend to hook into and onto each other and become one large mass. It is desirable to separate these parts into the individual pieces and without damage or breakage thereof.

Another object of the present invention is to provide a reciprocating parts separating apparatus which has minimal vibration thereto. This is achieved in part by a counterweight and counterbalancing system which is unique to the field.

A further object of this invention is to provide a method of separating parts which employs and utilizes the natural gravity force to assist in the part unentangling method. Again, it is important that the method effectively untangles the parts without damage or breakage thereof.

A still further object of this invention is to provide a parts untangler which employs a changeable grid to permit various sizes and shapes of parts to readily be separated by the use of this apparatus.

A still further object of this invention is to provide a parts separator having a unique crankshaft and counterbalance assembly in connection with the parts bin and counterweight spring mount for reducing vibratory motion and in order to effectively separate parts that are in an entangled mass when put into the apparatus.

The method and apparatus for separating entangled parts of this invention has many advantages over conventional type parts separators and methods thereof. A unique reciprocating method of separating parts is employed wherein the effective utilization of the natural force of gravity is employed. The method employs the use of horizontal bars in a grid spaced approximately 10% greater distance than the longest dimension of the parts to be separated and with the size of the bars large enough to prevent the parts from becoming directly locked thereupon. This grid structure is then reciprocated in a vertical direction at a speed fast enough to exceed gravity approximately 3:1. That is, the grid must accelerate about three times the force of gravity in the vertical direction. This reciprocation allows the parts on the bottom of the mass to spring and/or fall away from the mass and then pass through the grid. Because of the rapid rate of movement of the grid the mass of parts is bounced about, allowing the parts on the bottom to untangle and fall through in a unique and novel manner.

Since the apparatus involved in effecting the above method requires reciprocating movement in a vertical direction of a relatively heavy parts container with grid structure, in order to keep the vibratory motion to a minimum, a unique counterweight and drive system is utilized. The parts bin and grid bar assembly of one particularly useful size for the overall apparatus weighs approximately 49 pounds and reciprocates approximately 350 cycles per minute. The counterweight found to successfully and effectively operate with this structure also weighs approximately 49 pounds and reciprocates at the same rate. Without this combination structure as disclosed herein the overall device would not be practical.

The method and apparatus disclosed herein presents a novel method for separating entangled parts that tend to hook into each other and become one large mass the size of the container they are in. A very wide range and variety of sizes and shapes have been successfully untangled and with no breakage or other damage to any of the parts, regardless of how delicate or brittle the parts may be, by using the method and apparatus herein. The number and variety of part types and also the variety of sizes thereof that this apparatus can handle is very much greater than any other known parts separator structure. Also known devices tend to damage and/or break ring forms, such as those commonly desired to be separated and shown and described herein, this being due to the high impact constantly delivered by physical striking means and separator means as so often employed.

The apparatus disclosed herein has a crankshaft having two pins approximately 180 degrees apart and with one-half inch offset providing a one inch stroke for the bin-grid assembly and for the counterweight assembly. These assemblies operate and reciprocate 180 degrees from each other. This cancels out most of the accelerating-decelerating forces of the assembled structure. Also the parts bin-grid assembly and the counterweight assembly are each mounted by a flat spring suspension system which permits the relative vibratory force cancelling action of the overall structure without undue complication or future maintenance requirements.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the device of this invention.

FIG. 2 is a side elevational view, partly in cross section, taken generally along line 2—2 of FIG. 1.

FIG. 6 is a perspective view of the grid bar arrangement for the parts container of FIG. 4.

FIG. 7 is a plan view of various shapes of parts which can be untangled by the method and apparatus of this invention.

DESCRIPTION OF THE PREFERRED EMBODIMENT

Figure 4:
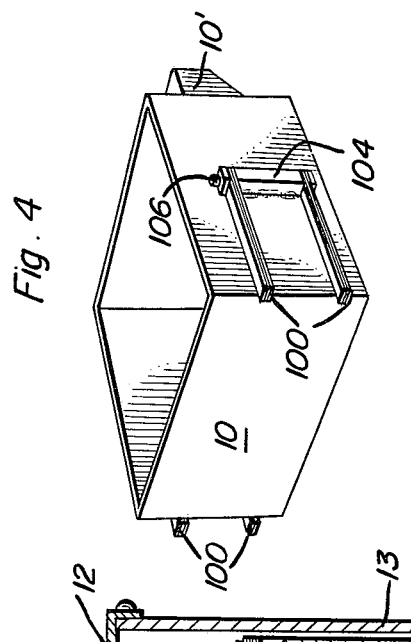
FIG. 4 is a perspective view of the parts bin or receptacle for the entangled parts with the spring suspension therefor.

Referring to FIG. 1 of the drawings, the overall apparatus of this invention may be seen as viewed from the top thereof. Reference numeral 10 indicates the parts bin receptacle which has horizontal spaced grid bar structure 20 removably mounted at the bottom of the container 10. A counterweight assembly 30 is provided for counterbalancing and offsetting the vibratory action of the main parts container. A drive motor 40 together with an output shaft 42 (see FIG. 2) and a drive pulley 44 mounted upon said shaft provide motive power for the overall apparatus through a drive belt 50 connected to a driven pulley 60 for the crankshaft of the apparatus. A crankshaft 70, of conventional crankshaft type structure and shape, appropriately connects and supports for reciprocating motion, connecting rods 80 and 90. Suitable bearings, not shown, are mounted between the ends of the connecting rods 80 and 90. Suitable bearings, not shown, are mounted between the ends of the connecting rods 80 and 90 and the throws of the crankshaft 70. The structure 70, 80 converts the rotary motion from the pulley 60 into the necessary reciprocating motion of the parts bin 10 with grid 20 therein, and effects the desired action of the bin-grid for separating entangled parts or articles which have been placed in the parts bin on the grid. The connecting rod 90 with suitable bearings on the crankshaft 70 is connected to the counterweight 30 for converting rotary motion of the power source to the necessary reciprocating motion of the counterweight in order to cancel out the vibratory motion of the parts bin and grid. Spring packs 100 and 110 are used for supporting and movably suspending the parts bin and counterweight, the packs 100 and 101 connecting to the inner wall of the support structure 13. The necessary relative position of the counterweight and parts bin may be seen in FIG. 1. This is explained in greater detail below.

Looking at FIG. 2, the crankshaft support bearings 11 may be seen together with the frame cap 12 as in place, and a cross section of the main support frame 13, the connecting rods 80 and 90, a cross section of the parts bin 10 and the grid structure 20, and a cross section of the counterweight 30. It should be noted that the main frame 13 may be appropriately secured to a support table or other support structure by conventional type mounting bolts 23 as indicated.

The support structure 13 with strengthening partitions and support brackets, etc. may be of any desired material and relative appearance, just as long as the necessary strength and rigidity is present to support the primary components of the apparatus.

Figure 3:
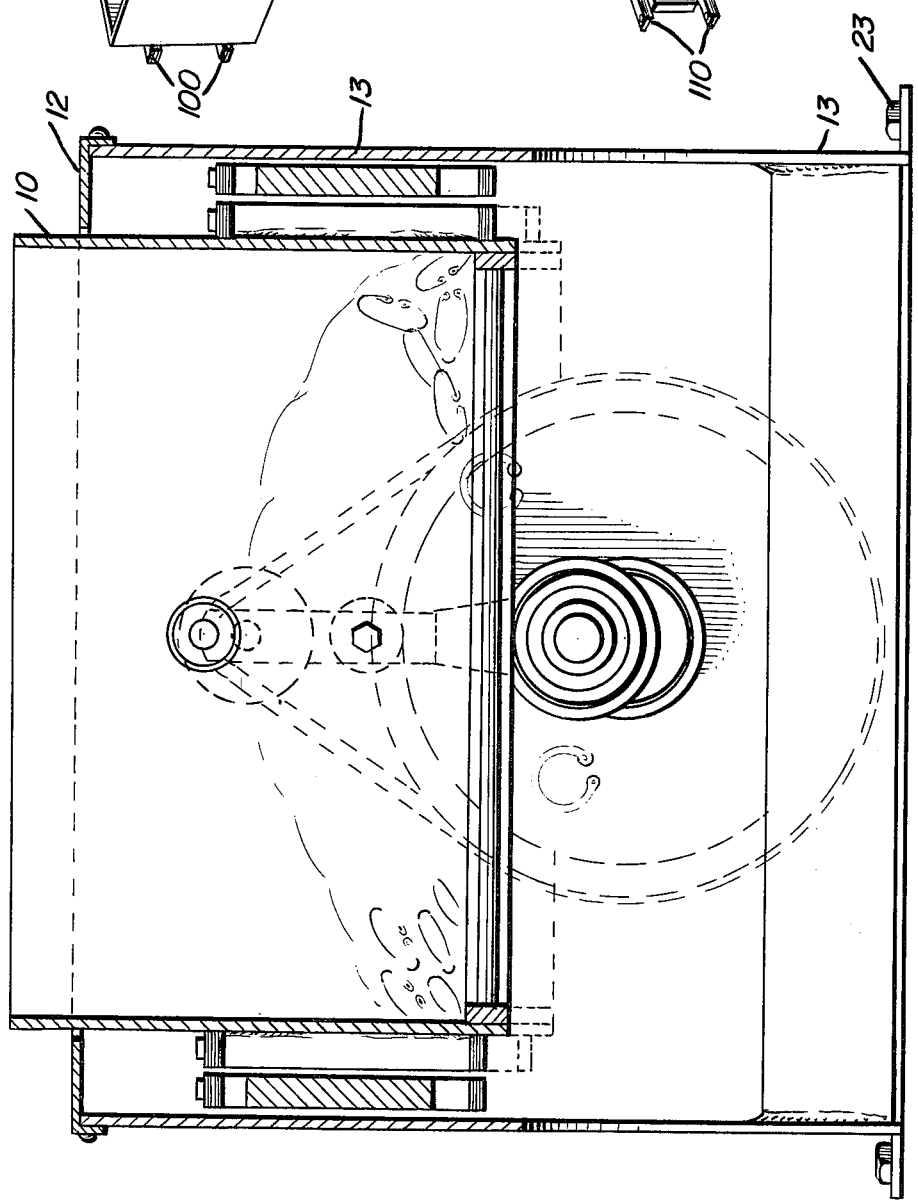
FIG. 3 is an end elevational view, partly in cross section, taken generally along line 3—3 of FIG. 2.

Looking now at FIG. 3 and with reference to FIG. 1 also, one can see the necessary relative position of the counterweight 30 and the parts bin 10. This arrangement, both the shape and position of the counterweight and parts bin, allows for positioning the two masses with their respective center of gravities in the same plane at right angles to the crankshaft centerline. This arrangement of parts bin, counterweight, and crankshaft pin position, spaced at approximately 180 degrees from each other around the center-line of the parts bin and the counterweight, makes for an effective vibration-dampening design. It has been found to be extremely effective in actual use for reducing and practically eliminating all of the vibratory motion in excess of that needed for the actual parts separation.

FIG. 4 shows the parts bin 10 in perspective together with the projecting back cover 10' for enclosing the upper end of the connecting rod assembly 80, and also shows in perspective the spring packs 100 used for suspending this bin. The spring packs 100 consist of one or more flat springs at each side attached to an appropriately spaced bracket 104 by means of spacers and bolt attachments 106. This means of suspension for the parts bin is extremely simple, requires no lubrication, has extremely low maintenance, and is very economical to manufacture.

Figure 5:
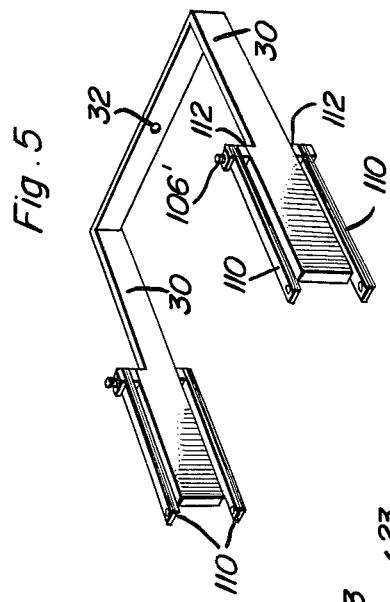
FIG. 5 is a perspective view of the counterweight and spring suspension therefor.

FIG. 5 shows the basic shape of the counterweight assembly in order to allow its center of gravity to be in the correct relative position to the parts bin when they are assembled as in the primary FIGS. 1, 2 and 3. Also the spring packs 110, which are similar to those 100 described above, may be seen as used for the suspension of the counterweight 30. Spacers 112 are provided to separate the individual flat spring components from the counterweight assembly and again spacer and bolt members 106' are used to retain same attached.

Looking at FIG. 2 again, the upper end 82 of connecting rod 80 is appropriately connected to the parts bin 10 by means of a bearing and connecting pin 84 mounted by conventional means and likewise the upper end 92 of connecting rod 90 is shown as connected by another bearing and connecting bolt 94. The relative reciprocating movement of the parts bin and counterweight assembly is indicated by the double lined arrow A in FIG. 2. The spring suspension packs 100 and 110 also are indicated in dotted lines in this figure.

Looking at FIG. 6, the grid bar assembly 20 may be seen in greater detail. The bars 22 are appropriately spaced and separated at a distance apart of approximately 10% greater than the maximum length of the parts to be untangled. Side members 21 support and hold them in rigid relationship. A number of different size grid bar structures 20 normally would be provided for use with this apparatus in order to increase the adaptability and flexibility of same. The dimensions as just described will also be seen in FIG. 2 as two sample parts B are shown in this figure passing between adjacent grid bars. At each of the ends of the grid bar support structure 21 are appropriate apertures 24 for retention of the assembly 20 within the parts bin 10 by pins 26 or other appropriate means. In use the entangled mass of articles is placed on the grid as installed in the parts bin. The grid must be specifically designed for each different size and shape of articles being disentangled. The complete grid is made up to two support rails 21 separated by the bars 22, which may be either round or rectangular, and sized in diameter or cross section to prevent the articles being separated from snapping over them and remaining on them. The bars 22 must be spaced enough apart to allow the longest dimension of the article being disentangled to pass therethrough.

FIG. 7 shows some of the typical shapes of the parts which this device and method is capable of disentangling. As can be seen the part labelled B is almost completely circular in shape with an opening along the circumference thereof, the part labelled C is generally of rectangular configuration and also has an opening along one side thereof, while the remaining part D generally combines the two shapes already described. Parts of many other shapes may be effectively disentangled, these three merely shown as examples. Obviously these parts offer a number of interengaging surfaces and ends which will readily become entangled when a number of similar parts are piled or loaded into a container. Once such a container is shipped or handled extensively, the parts inherently become greatly entangled. To separate same by hand or other method is extremely laborious and time-consuming.

Conventional type separators will not properly handle this job either. It has been found that the method employed herein of reciprocating an entangled mass of such components vertically to permit the action of gravity to be involved effectively allows for disentanglement of these parts. It is important that the rate of reciprocation be approximately three times faster than the amount or action of gravity. This rate has been found to work extremely well.

As can be visualized by looking at FIG. 2, the support frame 13 is so designed as to provide an open area directly beneath the reciprocating parts bin 10 with the grid structure assembly 20 at the bottom thereof. This is for the purpose of providing a disentangled part receiving receptacle directly therebeneath or a conveyor belt or other means for removing the parts as they become disentangled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for separating individual parts from an entangled mass of like parts, the parts hooking or otherwise engaging each other to form the entangled mass, the apparatus comprising:
   frame means;
   bin means for holding the mass of entangled parts, the bin means having an opening at the lower portion thereof;
   first spring means carried on the bin means and elastically mounting said bin means to said frame means for relative motion therebetween;
   counterbalance means disposed at least partially about the periphery of the bin means and spaced therefrom;
   second spring means carried on the counterbalance means and elastically mounting said counterbalance means to said frame means for relative motion therebetween;
   drive means connected to and mounting the bin means and the counterbalance means for moving said bin means and said counterbalance means in a reciprocal vertical motion at a predetermined rate, the bin means being reciprocally driven 180 degrees out of phase with the reciprocal movement of the counterbalance means; and
   spaced bars connected to the bin means at lower portions thereof and extending across the opening in said bin means, the longitudinal axes of the bars being substantially parallel, the bars being spaced from each other a distance greater than the largest dimension of an individual part comprising said mass of entangled parts, the mass of entangled parts surmountably contacting the spaced bars at least when the bin means are at rest, vertical reciprocal motion of the bin means and the counterbalance means as caused by the drive means causing the entangled parts to separate and fall through the spacings between the bars, the out of phase vertical reciprocal motion of the counterbalance means acting, along with the first and second spring means, to dampen the vibratory forces of said bin means and parts contained therein which are transmitted to the frame means.

2. The apparatus of claim 1 wherein the combined weight of the bin means and the spaced bars is substantially equal to the weight of the counterbalance means.

3. The apparatus of claim 1 wherein the drive means vertically reciprocate the bin means and the mass of entangled parts therein at approximately three times the force of gravity acting on the bin means and mass of entangled parts in order to cause the mass of parts to bounce and vibrate within the bin means to effect the untangling of the parts.

4. The apparatus of claim 1 and further comprising spaced support bars respectively connected to the ends of the first-mentioned bars, the support bars being substantially parallel to each other and being removably mounted to the bin means across the opening formed in the lower portion thereof.

5. The apparatus of claim 1 wherein the drive means comprise:
   a drive motor mounted on the frame means and having a rotary output; and
   output conversion means driven by said drive motor for converting rotary output of the motor to reciprocating vertical motion, at least portions of the output conversion means being connected to the bin means and counterbalance means respectively for relative motion therebetween, the bin means and counterbalance means being thereby driven in a reciprocating vertical motion by the rotary output of the drive motor.

6. The apparatus of claim 5 wherein the output conversion means comprise:
   a crankshaft;
   bearing means mounting said crankshaft for rotary movement on the frame means;
   a first drive pivotally carried on the crankshaft and pivotally connected to the bin means;

a second drive rod pivotally carried on the crankshaft and pivotally connected to the counterbalance means; and means on the crankshaft for pivotally mounting said first and second drive rods for respective 180 degree out of phase reciprocal movement therebetween.

7. The apparatus of claim 1 wherein the counterbalance means comprise:

a weighted yoke member, each arm of which extends partially about the periphery of the bin means, the weighted member being connected at the intersection of the arms to the drive means and being mounted thereby.

8. The apparatus of claim 7 wherein the second spring means comprise:

elongated flat elastic members, the elastic members being each secured at one end to the weighted yoke member near the free end of each arm thereof, the other end of each of the elastic members being secured to the frame means.

9. The apparatus of claim 7 wherein the elastic members comprise a plurality of stacked, flat elastic springs attached together at the respective ends thereof.

10. The apparatus of claim 7 wherein the bin means comprises a box-like containing structure, side walls thereof forming right angles at intersections thereof, the yoke member comprising a support bar means from which the arms extend at right angles, the support bar means being connected centrally thereof to the drive means and being mounted thereby, the support bar means and the arms of the yoke member extending about at least three sides of the box-like structure and being spaced proximously thereto.

11. The apparatus of claim 10 wherein the first spring means comprise:

elongated flat elastic members, the elastic members being each secured at one end to exterior wall surfaces of spaced opposing walls forming the box-like structure of the bin means, the other end of each of the elastic members being secured to the frame means.

12. The apparatus of claim 11 wherein the elastic members comprise a plurality of stacked, flat elastic springs attached together at the respective ends thereof.

13. The apparatus of claim 10 wherein the drive means comprise a crankshaft and wherein the centers of gravity of the bin means and of the counterbalance means lie in a plane which is perpendicular to the longitudinal axis of the crankshaft.

* * * * *